United States Patent
Kim et al.

(10) Patent No.: US 7,060,185 B2
(45) Date of Patent: Jun. 13, 2006

(54) SEWAGE TREATMENT APPARATUS USING SELF-GRANULATED ACTIVATED SLUDGE AND SEWAGE TREATMENT METHOD THEREOF

(75) Inventors: Kwang-Soo Kim, Goyang-Si (KR); Chai-Sung Gee, Goyang-Si (KR); Hee-Ja Lee, Bucheon-Si (KR); Chang-Woon Kim, Incheon (KR); Byung-Won Seo, Seoul (KR); Kwang-Ho Ahn, Seoul (KR); Hyun-Hee Cho, Seoul (KR); Yo-Sub Byun, Seoul (KR)

(73) Assignee: Korea Institute of Construction Technology, Gyeonggi-do (KR)

( * ) Notice: Subject to any disclaimer, the term of this patent is extended or adjusted under 35 U.S.C. 154(b) by 0 days.

(21) Appl. No.: 10/734,342

(22) Filed: Dec. 11, 2003

(65) Prior Publication Data

US 2004/0206700 A1 Oct. 21, 2004

(30) Foreign Application Priority Data

Apr. 21, 2003 (KR) .................... 10-2003-0025135
Oct. 11, 2003 (KR) .................... 10-2003-0070837

(51) Int. Cl.
 *C02F 3/30* (2006.01)
 *C02F 3/08* (2006.01)
(52) U.S. Cl. ............... 210/605; 210/616; 210/622; 210/629; 210/196; 210/259

(58) Field of Classification Search ............... 210/605, 210/615, 616, 617, 622, 629, 194, 195.1, 210/196, 252, 259
See application file for complete search history.

(56) References Cited

U.S. PATENT DOCUMENTS

| | | | | |
|---|---|---|---|---|
| 5,531,896 A | * | 7/1996 | Tambo et al. | 210/605 |
| 5,599,451 A | * | 2/1997 | Guiot | 210/605 |
| 5,702,604 A | * | 12/1997 | Yamasaki et al. | 210/603 |
| 5,885,460 A | * | 3/1999 | Dague et al. | 210/605 |
| 2003/0159991 A1 | * | 8/2003 | Tay et al. | 210/620 |
| 2005/0205490 A1 | * | 9/2005 | Park et al. | 210/605 |

FOREIGN PATENT DOCUMENTS

| | | | |
|---|---|---|---|
| JP | 9-225494 | * | 9/1997 |
| KR | 2004-084200 | * | 10/2004 |

* cited by examiner

*Primary Examiner*—Fred G. Prince
(74) *Attorney, Agent, or Firm*—Sheridan Ross P.C.

(57) ABSTRACT

Provided is an apparatus for processing sewage by granulating activated sludge and a method thereof. The sewage processing apparatus includes an anaerobic granulation tank for granulating suspended microorganisms; an indirect aeration tank for supplying oxygen to the supernatant transported through a first transport pipe; an aerobic granulation tank for granulating suspended microorganisms; and a discharge pipe for discharging supernatant of finished water obtained after circulating a series of the anaerobic granulation tank, the first transport pipe, the indirect aeration tank, the aerobic granulation tank repeatedly.

9 Claims, 2 Drawing Sheets

SEWAGE TREATMENT APPARATUS USING SELF-GRANULATED ACTIVATED SLUDGE AND SEWAGE TREATMENT METHOD THEREOF

FIELD OF THE INVENTION

The present invention relates to a sewage treatment apparatus and method; and, more particularly, to a sewage treatment apparatus which removes nitrogen and phosphorus as well as organic matters by granulating them and forming sludge, and a sewage treatment method thereof.

DESCRIPTION OF RELATED ART

Conventionally, a sewage treatment apparatus including an anaerobic reactor, an anoxic tank, an aeration tank and a settling tank is used to remove nitrogen and phosphorus biologically using suspended microorganisms. In the anaerobic reactor, microorganisms release phosphorus out of their cells. In the anoxic tank, $NO_3^-$ and $NO_2$ are reduced into $N_2$ gas by denitrification microorganisms.

In the aeration tank, organic matters are removed and the phosphorous released from the anaerobic reactor is removed by phosphorous-removing microorganisms that take in the phosphorous overly, and nitrogen is oxidized by nitrogen oxidizing microorganisms. In the settling tank, the suspended microorganisms are settled down to separate the microorganisms from finished water.

To remove phosphorous using the conventional apparatus, a process of transporting the sludge of the anaerobic reactor that has passed through the anoxic tank into the aeration tank, sending the sludge from the aeration tank back to the anaerobic reactor and then passing the sludge through the aeration tank again is repeated. To remove nitrogen, the sludge should pass through the anoxic tank and the aeration tank repeatedly.

The sewage treatment method using suspended microorganisms, however, maintains the concentration of the microorganisms in the anaerobic reactor and the anoxic tank by returning the sludge generated in the aeration tank. Since the suspended microorganisms keep on moving to each tank, the inhabitation environment of the microorganisms is changed continuously. This makes it hard to cultivate a species of microorganism as a dominant species of each environmental condition and limits the efficiency of removing contaminants.

Researchers have made an effort to improve the problems of the conventional biological sewage treatment apparatus and method. One of such efforts is Korean Patent No. 0357042, which is incorporated herein by reference, that discloses a method of granulating suspended microorganisms to thereby form granulated activated sludge and remove nitrogen and phosphorous, instead of using conventional suspended microorganisms.

To be more specific, the Korean Patent No. 0357042 provides a sewage treatment apparatus including an indirect aeration tank for supplying air, and a biological granulation reactor with an agitator for granulating the suspended microorganisms. According to its technology, sewage is treated by supplying aerated mixture of the indirect aeration tank, which has abundant dissolved oxygen to the biological granulation reactor, in the form of upward streams. The suspended microorganisms collide with each other by the irrigation force of the upward streams and the agitation power of the agitator in the biological granulation reactor under an aerobic condition full of dissolved oxygen, and they are transformed into granulated microorganisms due to a bridging reaction between gelatin materials produced by the microorganisms.

The technology of the above patent does not require an additional solid-liquid separation apparatus, because the granulated microorganisms have excellent flocculation property. Moreover, since the microorganisms are granulated in one biological granulation reactor which is full of dissolved oxygen, aerobic microorganisms inhabit on the surface of the granulated activated sludge where the chances for contacting the dissolved oxygen are relatively high, while anaerobic microorganisms inhabit in the inside of the granulated activated sludge where oxygen exists scarcely or anaerobic condition is maintained. Therefore, organic matters, nitrogen and phosphorous can be removed by cultivating microorganisms in one biological reaction tank.

This method can remove contaminants by granulating suspended microorganisms in the aerobic condition full of dissolved oxygen and growing aerobic microorganisms on the surface of the activated sludge as well as growing anaerobic microorganisms within the granular activated sludge. In the prior art, however, only the aerobic microorganisms with faster growth rate become a dominant species. So, the anaerobic microorganisms for removing nitrogen and phosphorous hardly take the place of the dominant species. Also, due to the competition between the microorganisms in and out of the granulated activated sludge, the method does not remove nitrogen and phosphorous efficiently.

SUMMARY OF THE INVENTION

It is, therefore, an object of the present invention to provide a method for treating sewage by granulating suspended microorganisms to form granulated activated sludge which is dominated by anaerobic microorganisms under an anaerobic condition. The method of the present invention is different from a prior art which uses aerobic microorganisms to treat granulated activated sludge under an aerobic condition.

After repeated research and experiments to achieve the technological object described above, a new sewage treatment method, which is described herein, is invented. The method of the present invention can remove contaminants included in sewage, such as organic matters, nitrogen and phosphorous, at a high efficiency by adding an anaerobic granulation tank to the elements of Korean Patent No. 0357042, which are an aerobic granulation tank and an indirect aeration granulation tank, granulating activated sludge in each granulation tank, and making, respectively, aerobic and anaerobic microorganisms become a dominant species in the environment of each granulation tank without transporting the microorganisms.

It is another object of the present invention to provide an apparatus for processing sewage, the apparatus including an anaerobic granulation tank, an indirect aeration tank, and an aerobic granulation tank.

In accordance with an aspect of the present invention, there is provided an apparatus for treating sewage by using granulated activated sludge, including: an anaerobic granulation tank for granulating suspended microorganisms with irrigation force of influent sewage or returned water and agitation power by an agitator, the anaerobic granulation tank including the agitator; a first transport pipe for transporting supernatant of the anaerobic granulation tank except the sludge granulated in the anaerobic granulation tank; an indirect aeration tank for supplying oxygen to the supernatant transported through the first transport pipe; a second transport pipe for transporting aqueous solution saturated with dissolved oxygen by receiving oxygen in the indirect aeration tank; an aerobic granulation tank for granulating suspended microorganisms with irrigation force of the aqueous solution transported through the second transport pipe and agitation power by an agitator, the aerobic granulation tank including the agitator; a third transport pipe for transporting supernatant of the aerobic granulation tank to the anaerobic granulation tank except the sludge granulated in the aerobic granulation tank; and a discharge pipe for discharging supernatant of finished water which is obtained after circulating a series of the anaerobic granulation tank, the first transport pipe, the indirect aeration tank, the second transport pipe, the aerobic granulation tank, and the third transport pipe repeatedly.

Preferably, the first transport pipe connects the upper part of the anaerobic granulation tank with the lower part of the indirect aeration tank, and the second transport pipe connects the lower part of the indirect aeration tank with the lower part of the aerobic granulation tank, and the third transport pipe connects the upper part of the aerobic granulation tank with the lower part of the anaerobic granulation tank.

It is also preferable that the third transport pipe is connected with a pump for controlling a flow rate of the supernatant of the aerobic granulation tank which returns to the anaerobic granulation tank.

The anaerobic granulation tank further may include a pump for controlling a flow rate of the influent sewage that flows into the anaerobic granulation tank. The indirect aeration tank can is connected with an oxygen supply device for providing oxygen to the indirect aeration tank.

In accordance with another aspect of the present invention, there is provided a method for treating sewage by using granulated activated sludge, including the steps of: a) agitating influent sewage that flows in through the lower part of an anaerobic granulation tank or returned water with an agitator to granulate suspended microorganisms and thereby form granulated sludge in the anaerobic granulation tank; b) transporting supernatant of the anaerobic granulation tank to an indirect aeration tank through a first transport pipe, except the granulated sludge in the anaerobic granulation tank; c) supplying oxygen to the supernatant transported to the indirect aeration tank; d) transporting aqueous solution saturated with dissolved oxygen by receiving oxygen in the indirect aeration tank to the lower part of an aerobic granulation tank through a second transport pipe; e) agitating the aqueous solution transported to the aerobic granulation tank with an agitator to granulate suspended microorganisms and thereby form granulated sludge in the aerobic granulation tank; f) transporting supernatant of the aerobic granulation tank to the anaerobic granulation tank through a third transport pipe, except the granulated sludge in the aerobic granulation tank; and g) discharging supernatant of finished water which is obtained after circulating a series of the anaerobic granulation tank, the first transport pipe, the indirect aeration tank, the second transport pipe, the aerobic granulation tank and the third transport pipe repeatedly through a discharge pipe.

Preferably, water flow is induced based on gravity by forming the first transport pipe to connect the upper part of the anaerobic granulation tank with the lower part of the indirect aeration tank, the second transport pipe to connect the lower part of the indirect aeration tank with the lower part of the aerobic granulation tank, and the third transport pipe to connect the upper part of the aerobic granulation tank with the lower part of the anaerobic granulation tank.

It is preferable that the third transport pipe is connected with a pump and controls a flow rate of the supernatant of the aerobic granulation tank that returns to the anaerobic granulation tank by using the pump.

It is also preferable that a flow rate of the influent sewage that flows in through the lower part of the anaerobic granulation tank is controlled by using a pump.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. A drawing and description provided in the present specification do not restrict the spirit and scope of the present invention.

Figure 1:
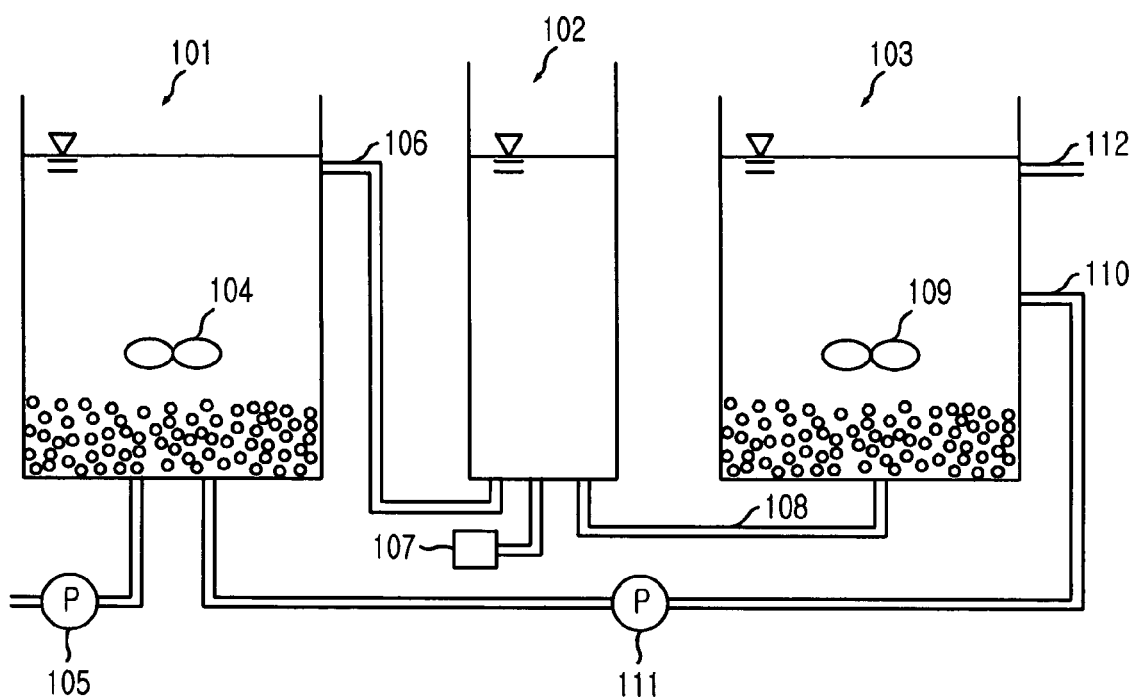
FIG. 1 is a diagram describing a sewage treatment apparatus using granulated activated sludge in accordance with the present invention.

FIG. 1 is a diagram describing a sewage treatment apparatus using self-granulated activated sludge in accordance with the present invention. When an aqueous solution receiving oxygen from an oxygen supplying unit such as a compressor 107 in an indirect aeration tank 102 and thus saturated with dissolved oxygen is sent to an aerobic granulation tank 103, irrigation force caused by the flow of the aqueous solution and agitation power by an agitator 109 in the aerobic granulation tank 103 are applied to activated sludge particles.

The activated sludge particles collide with each other to be granulated due to gelatin material which is a by-product of a reaction between microorganisms. The aerobic granulation tank 103 becomes aerobic due to the aqueous solution full of dissolved oxygen, and oxidation microorganisms for removing nitrogen and microorganisms for removing organic matters that use the dissolved oxygen as electron acceptor are granulated by the irrigation force and the agitation power.

As shown above, the microorganisms for removing organic matters under the aerobic condition of the aerobic granulation tank 103 removes the organic matters by oxidizing them. However, the nitrogen-oxidizing microorganisms oxidize ammoniac nitrogen ($NH_4^+$) in sewage into $NO_3^-$ or $NO_2^-$. So, these nitrogen oxides remain dissolved in the sewage. Therefore, it is desirable to send the supernatant of the aerobic granulation tank 103 back to the anaerobic granulation tank 101 for re-treatment, because the supernatant still includes the nitrogen oxides, e.g., $NO_3^-$ and $NO_2^-$.

In prior arts using suspended microorganisms, both sludge and supernatant are sent back to remove the nitrogen oxides. However, in accordance with the present invention, only the supernatant of the aerobic granulation tank 103 is sent back to the anaerobic granulation tank 101 and the granulated activated sludge is not sent back but remains where it is. As a result, the microorganisms for removing organic matters and the nitrogen oxidizing microorganisms which inhabit in the granulated activated sludge become a dominant species in the aerobic granulation tank 103.

When the supernatant of the aerobic granulation tank 103 is sent back to the anaerobic granulation tank 101, it should flow upward with the help of a pump 111. Here, another pump 105 controls the flux of the supernatant in the aerobic granulation tank 103 in agreement with the flux of the influent sewage, i.e., the supernatant, flowing in upward to the anaerobic granulation tank 101.

When the irrigation force of the upward flowing and the agitation power by the agitator 104 in the anaerobic granulation tank 101 are applied to the activated sludge in the anaerobic granulation tank 101, activated sludge is granulated through a bridging reaction between gelatin materials, which are by-products of a reaction between the microorganisms.

Meanwhile, the supernatant of the aerobic granulation tank 103 that flows in to the anaerobic granulation tank 101 contains little oxygen because most of the dissolved oxygen is consumed by the microorganisms granulated in the aerobic granulation tank 103. Influent sewage, also, is contaminated by organic matters so it has a low degree of dissolved oxygen saturation.

Accordingly, in the anaerobic granulation tank 101 where such influent sewage and the supernatant of the aerobic granulation tank 103 are held, an anaerobic environment is formed. In the anaerobic granulation tank 101, the microorganisms that can remove nitrogen and phosphorous and thrive in such anaerobic environment are granulated by the irrigation force and the agitation power.

The microorganisms for removing nitrogen become a dominant species on the surface of the granulated activated sludge in contact with $NO_3^-$ and $NO_2^-$. The $NO_3^-$ and $NO_2^-$ are reduced into $N_2$ gas to be removed by using the $NO_3^-$ and $NO_2^-$ included in the supernatant of the aerobic granulation tank 103 as electron acceptors and using the carbons of the organic matters in the influent sewage as proton donors. The phosphorous-removing microorganisms becomes a dominant species in the inside of the granulated activated sludge, which is anaerobic. Liquefactive phosphorous liquated out of the microorganisms inside the granulated activated sludge and the phosphorous included in the influent sewage are removed, as they are excessively absorbed into the granulated activated sludge in the nitrogen removal process.

The supernatant of the anaerobic granulation tank 101 in which the nitrogen oxide generated in the aerobic granulation tank 103 is denitrified, and the supernatant of the anaerobic granulation tank 101 in which phosphorous included in the influent sewage is removed go into the indirect aeration tank 102 again by gravity.

The supernatant of the anaerobic granulation tank 101 which is supplied with air in the indirect aeration tank 102 flows in into the aerobic granulation tank 103. Then, the organic matters and the nitrogen components that are not removed in the anaerobic granulation tank 101 are oxidized in the aerobic granulation tank 103.

According to the principle and method of the present invention, which are described in the above, sewage circulates a series of the anaerobic granulation tank 101, the indirect aeration tank 102 and the aerobic granulation tank 103 repeatedly, and the supernatant of finished water which is free from organic matters, nitrogen and phosphorous is discharged through the discharge pipe 112 of the aerobic granulation tank 103.

EXAMPLE

In accordance with the present invention, an anaerobic granulation tank, an indirect aeration tank and an aerobic granulation tank were installed sequentially, and sewage was drawn into the anaerobic granulation tank by using a pump. The sewage stayed in the anaerobic granulation tank for more than two hours to granulate activated sludge.

The supernatant of the anaerobic granulation tank except the granulated activated sludge stayed in the indirect aeration tank for 30 minutes, and air is supplied with a compressor so that the concentration of oxygen could reach supersaturation. Then, the supersaturated supernatant of the anaerobic granulation tank stayed in the aerobic granulation tank for four hours, which was the final step.

Here, the operation rates of an agitator installed in the anaerobic granulation tank and the aerobic granulation tank were all controlled to be 5 to 10 rpm. The irrigation force (area-based load) was controlled to be 30 to 40 $m^3/m_2.d$. When the supernatant of the aerobic granulation tank was sent back to the anaerobic granulation tank, its flow rate was controlled to be about 10 times as much as that of the influent sewage flowing in into the anaerobic granulation tank.

In the above-described method, about 200 L of the sewage was processed a day. In the example of the present invention, the pump was used only when the influent sewage or the sidestream flows into the anaerobic granulation tank, and the other flowing was activated by gravity. In this example, the finished water from the aerobic granulation tank was discharged by using gravity as much as the influent sewage flows in into the anaerobic granulation tank, and the remaining extent of organic matters, nitrogen and phosphorous is examined.

Comparative Example

Figure 2:
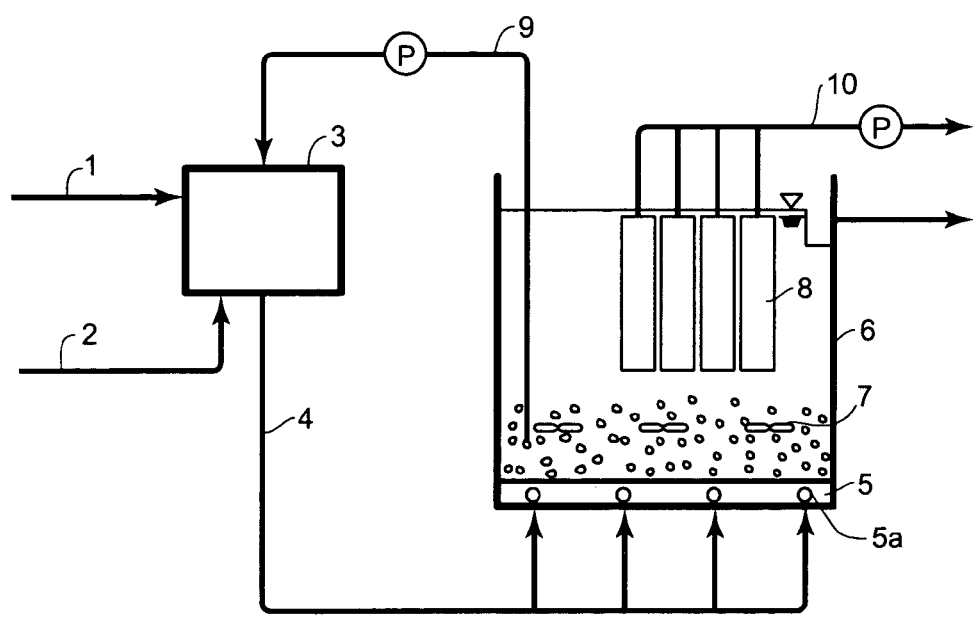
FIG. 2 is an illustrative diagram of an embodiment of a sewage treatment system disclosed in Korean Patent No. 0357042.

FIG. 2 shows is an illustrative embodiment from Korean Patent No. 0357042 of a water treatment system, wherein the various components are identified as follows:

(a) An indirect aeration tank (3) for supplying a flow of air ($f^2$) to a mixed solution of inflowing sewage ($f^1$), and inflowing granular sludge ($f^3$), wherein an aerated mixed solution results.

(b) A supply line (4) including a plurality of spout pipes (5), having spouts (5a) at one side of each such pipe, for transporting the aerated mixed solution from the indirect aeration tank (3).

(c) An aerobic granulation tank (6), wherein sludge particles in the aerated mixed solution from the aeration tank (3) are provided to the granulation tank (6), and wherein such particles are suspended within the aerobic granulation tank for contacting one another, and thereby resulting in a granulation reaction. Note that the granulation reaction produces a sludge layer at the bottom of the aerobic granulation tank (6), the sludge layer shown as dots in the lower ⅓ of the tank (6).

(d) A sludge contact medium (7) in the aerobic granulation tank (6) for enhancing the contact between the suspended sludge particles in the tank (6), and thereby enhance granulation of such particles resulting in the sludge in the tank (6).

(e) A discharge pipe (9) for discharging from the aeration tank (6), to the indirect aeration tank (3), at least a portion of the solution mixed with sludge granulations.
(f) A pump (denoted "P" on the discharge pipe (9)) for driving the discharge from the aeration tank (6) to the indirect aeration tank (3).
(g) A membrane module (8) provided in the aeration tank (6) above the granular sludge layer, wherein the membrane module (8) filters water exiting the aeration tank (6) via pipe 20 and the pump denoted "P" on pipe 20.

An indirect aeration tank and a granulation bioreactor according to FIG. 2 which, however, does not include the membrane module (8) were installed sequentially according to Korean Patent No. 0357042 as above-described, and the other conditions were given the same as the above example of the present invention. Then, sewage treatment was performed.

Table 1 shows how much organic matters, nitrogen and phosphorous are removed in the example of the present invention and the comparative example.

TABLE 1

|  |  | COD | BOD | SS | TKN | NO$_3$—N | T-N | T-P |
|---|---|---|---|---|---|---|---|---|
| Example | Influent Water (mg/l) | 350 | 168 | 120 | 39 | 1 | 40 | 8 |
|  | Finished Water (mg/l) | 18 | 10 | 2 | 1 | 2 | 3 | 0.5 |
|  | Sewage Treatment Efficiency (%) | 95 | 94 | 98 | 97 | — | 93 | 94 |
| Comparative Example | Influent Water (mg/l) | 350 | 168 | 120 | 39 | 1 | 40 | 8 |
|  | Finished Water (mg/l) | 25 | 15 | 5 | 5 | 12 | 17 | 2.5 |
|  | Sewage Treatment Efficiency (%) | 93 | 91 | 96 | 90 | — | 58 | 69 |

In Table 1, COD stands for chemical oxygen demand; BOD, biological oxygen demand; SS, suspended solids; TKN, total kjeldahl nitrogen; NO$_3$—N, nitrate nitrogen; T—N, total nitrogen; and T—P, total phosphorous.

As shown in Table 1, both of the results of the example and the comparative example show excellent efficiency in removing organic matters, such as COD, BOD and SS. However, when the extents of nitrogen and phosphorous removal of the two examples are compared with each other from the processing efficiencies of T—N and T—P, the comparative example shows processing efficiencies of 58% and 69%, respectively, while the example of the present invention yields processing efficiencies of 93% and 94%, respectively.

The method of the present invention shows higher efficiency in removing nitrogen and phosphorous because it makes nitrogen-removing microorganisms and phosphorous-removing microorganisms become dominant species by installing an anaerobic granulation tank additionally, while the method of the comparative example removes the contaminants such as organic matters, nitrogen and phosphorous simultaneously by using the depth-based aerobic and anaerobic states of the granulated activated sludge in the aerobic granulation tank and thus induces competition between different microorganisms.

In accordance with the present invention, the efficiency of removing nitrogen and phosphorous can be increased remarkably by installing an anaerobic granulation tank additionally to an aerobic granulation tank and circulating the components dissolved in water repeatedly with maintaining activated sludge granulated in each tank as it is to thereby making nitrogen-removing microorganisms and phosphorous-removing microorganisms in the anaerobic granulation tank.

While the present invention has been described with respect to certain preferred embodiments, it will be apparent to those skilled in the art that various changes and modifications may be made without departing from the scope of the invention as defined in the following claims.

The invention claimed is:

1. An apparatus for treating sewage by using granulated activated sludge, comprising:
    an anaerobic granulation tank having an agitator for granulating suspended microorganisms with irrigation force of influent sewage or returned water and agitation power by a first agitator to thereby generate sludge;
    a first transport pipe for transporting supernatant of the anaerobic granulation tank except the sludge granulated in the anaerobic granulation tank;
    an indirect aeration tank for supplying oxygen to the supernatant transported through the first transport pipe;
    a second transport pipe for transporting aqueous solution saturated with dissolved oxygen by receiving oxygen in the indirect aeration tank;
    an aerobic granulation tank for granulating suspended microorganisms with irrigation force of the aqueous solution transported through the second transport pipe and agitation power by a second agitator, the aerobic granulation tank including the second agitator;
    a third transport pipe for transporting supernatant of the aerobic granulation tank to the anaerobic granulation tank except the sludge granulated in the aerobic granulation tank; and
    a discharge pipe for discharging supernatant of finished water which is obtained after circulating a series of the anaerobic granulation tank, the first transport pipe, the indirect aeration tank, the second transport pipe, the aerobic granulation tank, and the third transport pipe repeatedly.

2. The apparatus as recited in claim 1, wherein the first transport pipe connects the upper part of the anaerobic granulation tank with the lower part of the indirect aeration tank, and the second transport pipe connects the lower part of the indirect aeration tank with the lower part of the aerobic granulation tank, and the third transport pipe connects the upper part of the aerobic granulation tank with the lower part of the anaerobic granulation tank.

3. The apparatus as recited in claim 2, wherein the third transport pipe is connected with a pump for controlling a flow rate of the supernatant of the aerobic granulation tank which returns to the anaerobic granulation tank.

4. The apparatus as recited in claim 1, wherein the anaerobic granulation tank further includes a first pump for controlling a flow rate of the influent sewage that flows into the anaerobic granulation tank.

5. The apparatus as recited in claim 1, wherein the indirect aeration tank is connected with an oxygen supply device for providing oxygen to the indirect aeration tank.

6. A method for treating sewage by using granulated activated sludge, comprising the steps of:
   a) agitating influent sewage that flows in through the lower part of an anaerobic granulation tank or returned water with an agitator to granulate suspended microorganisms, to thereby form a first granulated sludge in the anaerobic granulation tank;
   b) transporting supernatant of the anaerobic granulation tank to an indirect aeration tank through a first transport pipe, except the first granulated sludge in the anaerobic granulation tank;
   c) supplying oxygen to the supernatant transported to the indirect aeration tank;
   d) transporting aqueous solution saturated with dissolved oxygen by receiving oxygen in the indirect aeration tank to the lower part of an aerobic granulation tank through a second transport pipe;
   e) agitating the aqueous solution transported to the aerobic granulation tank with an agitator to granulate suspended microorganisms, to thereby form a second granulated sludge in the aerobic granulation tank;
   f) transporting supernatant of the aerobic granulation tank to the anaerobic granulation tank through a third transport pipe, except the second granulated sludge in the aerobic granulation tank; and
   g) discharging supernatant of finished water which is obtained after circulating a series of the anaerobic granulation tank, the first transport pipe, the indirect aeration tank, the second transport pipe, the aerobic granulation tank and the third transport pipe repeatedly through a discharge pipe.

7. The method as recited in claim 6, wherein water flow is induced based on gravity by forming the first transport pipe to connect the upper part of the anaerobic granulation tank with the lower part of the indirect aeration tank, the second transport pipe to connect the lower part of the indirect aeration tank with the lower part of the aerobic granulation tank, and the third transport pipe to connect the upper part of the aerobic granulation tank with the lower part of the anaerobic granulation tank.

8. The method as recited in claim 6, wherein the third transport pipe is connected with a first pump and controls a flow rate of the supernatant of the aerobic granulation tank that returns to the anaerobic granulation tank by using the first pump.

9. The method as recited in claim 6, wherein a flow rate of the influent sewage that flows in through the lower part of the anaerobic granulation tank is controlled by using a second pump.

* * * * *